United States Patent
Saptharishi

(10) Patent No.: US 10,187,611 B2
(45) Date of Patent: Jan. 22, 2019

(54) VIDEO SURVEILLANCE SYSTEM WITH AERIAL CAMERA DEVICE

(71) Applicant: Avigilon Corporation, Vancouver (CA)

(72) Inventor: Mahesh Saptharishi, Sudbury, MA (US)

(73) Assignee: Avigilon Corporation, Vancouver (CA)

( * ) Notice: Subject to any disclaimer, the term of this patent is extended or adjusted under 35 U.S.C. 154(b) by 228 days.

(21) Appl. No.: 15/229,897

(22) Filed: Aug. 5, 2016

(65) Prior Publication Data

US 2018/0041733 A1 Feb. 8, 2018

(51) Int. Cl.
| | |
|---|---|
| *H04N 7/18* | (2006.01) |
| *B64C 39/02* | (2006.01) |
| *H04N 5/232* | (2006.01) |
| *G06K 9/00* | (2006.01) |

(52) U.S. Cl.
CPC ........... *H04N 7/181* (2013.01); *B64C 39/024* (2013.01); *G06K 9/00765* (2013.01); *G06K 9/00771* (2013.01); *H04N 5/23216* (2013.01); *H04N 5/23241* (2013.01); *H04N 5/23293* (2013.01); *H04N 5/23296* (2013.01); *H04N 7/185* (2013.01); *B64C 2201/027* (2013.01); *B64C 2201/108* (2013.01); *B64C 2201/127* (2013.01)

(58) Field of Classification Search
CPC ..................................................... H04N 7/181
USPC ........................................................ 348/144
See application file for complete search history.

(56) References Cited

U.S. PATENT DOCUMENTS

| | | | |
|---|---|---|---|
| 6,215,519 B1* | 4/2001 | Nayar | G08B 13/19608 348/148 |
| 9,238,414 B2 | 1/2016 | Ryberg et al. | |
| 9,387,928 B1 | 7/2016 | Gentry et al. | |
| 9,561,852 B1 | 2/2017 | Beaman et al. | |
| 2012/0169842 A1* | 7/2012 | Chuang | G08B 13/19619 348/39 |
| 2012/0173018 A1* | 7/2012 | Allen | G05D 1/0248 700/245 |
| 2015/0183326 A1* | 7/2015 | Ryberg | B60L 11/1809 320/109 |
| 2015/0215516 A1* | 7/2015 | Dolgin | H04N 5/23293 348/169 |
| 2015/0336669 A1 | 11/2015 | Kantor et al. | |
| 2016/0023762 A1* | 1/2016 | Wang | B64F 1/00 701/3 |
| 2016/0272317 A1* | 9/2016 | Cho | G08G 1/09 |
| 2016/0297545 A1* | 10/2016 | Yang | G05D 1/0011 |
| 2016/0360087 A1* | 12/2016 | Kwon | H04N 5/23229 |
| 2016/0360181 A1* | 12/2016 | Drako | H04B 1/40 |
| 2017/0134699 A1* | 5/2017 | Kim | H04N 7/183 |
| 2017/0337791 A1* | 11/2017 | Gordon-Carroll | G08B 13/19645 |
| 2017/0337824 A1* | 11/2017 | Chen | G08G 5/0086 |

* cited by examiner

*Primary Examiner* — Marnie A Matt
(74) *Attorney, Agent, or Firm* — Daniel Hammond

(57) ABSTRACT

A video surveillance system having a plurality of aerial camera devices such as cameras on drones operable from a plurality of docking stations. Each station having a dock for receiving, charging, and controlling the aerial camera devices.

16 Claims, 5 Drawing Sheets

VIDEO SURVEILLANCE SYSTEM WITH AERIAL CAMERA DEVICE

FIELD

The present subject-matter relates to a video surveillance system, and more particularly to a video surveillance system having an aerial camera device.

BACKGROUND

A camera may be used to acquire information about a place or an object. The information is visual image data generated by the camera corresponding to the scene falling with the field of view of the camera.

A typical video surveillance system uses one or more cameras to acquire information about an area being monitored. The one or more cameras are placed in strategic locations to ensure appropriate coverage of the area being monitored. When deployed within the typical video surveillance system, the cameras are static.

SUMMARY

The embodiments described herein provide in one aspect, a video surveillance system comprising: an aerial camera device being operable to be displaced aerially, the device comprising: a primary camera module defining a first field of view and being operable for generating primary image data corresponding to the first field of view; at least one battery for powering the camera module; and a charge receiving module for receiving power for charging the at least one battery; and a docking station comprising: a dock, the aerial camera device being received in the dock when in a docked position and being disengaged from the dock when in an airborne position; a charge transmitting module for transmitting power for charging the aerial camera device when in the docked position; at least one transceiver being operable for data communication with the aerial camera device when the aerial camera device is in the docked position and when the aerial camera device is in the airborne position; and a secondary camera module defining a second field of view and operable for generating secondary image data corresponding to the second field of view, the secondary image data providing visual feedback about the aerial camera device when the aerial camera device is within the second field of view while in the airborne position.

The embodiments described herein provide another aspect, A video surveillance system comprising: an aerial camera device being operable to be displaced aerially, the device comprising: a camera module defining a first field of view and being operable for generating image data corresponding to the first field of view; at least one battery for powering the camera module; and a charge receiving module for receiving power for charging the at least one battery; and a docking station comprising: a dock, the aerial camera device being received in the dock when in a docked position and being disengaged from the dock when in an airborne position; a charge transmitting module for transmitting power for charging the aerial camera device when in the docked position; and at least one transceiver being operable for data communication with the aerial camera device when the aerial camera device is in the docked position and when the aerial camera device is in the airborne position.

The embodiments described herein provide in yet another aspect, a video surveillance system comprising: a plurality of aerial camera devices each being operable to be displaced aerially, each device comprising: a camera module defining a first field of view and being operable for generating primary image data corresponding to the first field of view; at least one battery for powering the camera module; and a charge receiving module for receiving power for charging the at least one battery; and a plurality of docking stations, each station comprising: a dock, any given one of the aerial camera devices being adapted to be received in the dock when in a docked position and being disengaged from the dock when in an airborne position; a charge transmitting module for transmitting power for charging the given aerial camera device when in the docked position; and at least one transceiver being operable for data communication with the given aerial camera device when the aerial camera device is in the docked position and when the aerial camera device is in the airborne position.

BRIEF DESCRIPTION OF THE DRAWINGS

The detailed description refers to the following figures, in which.

Figure 1:
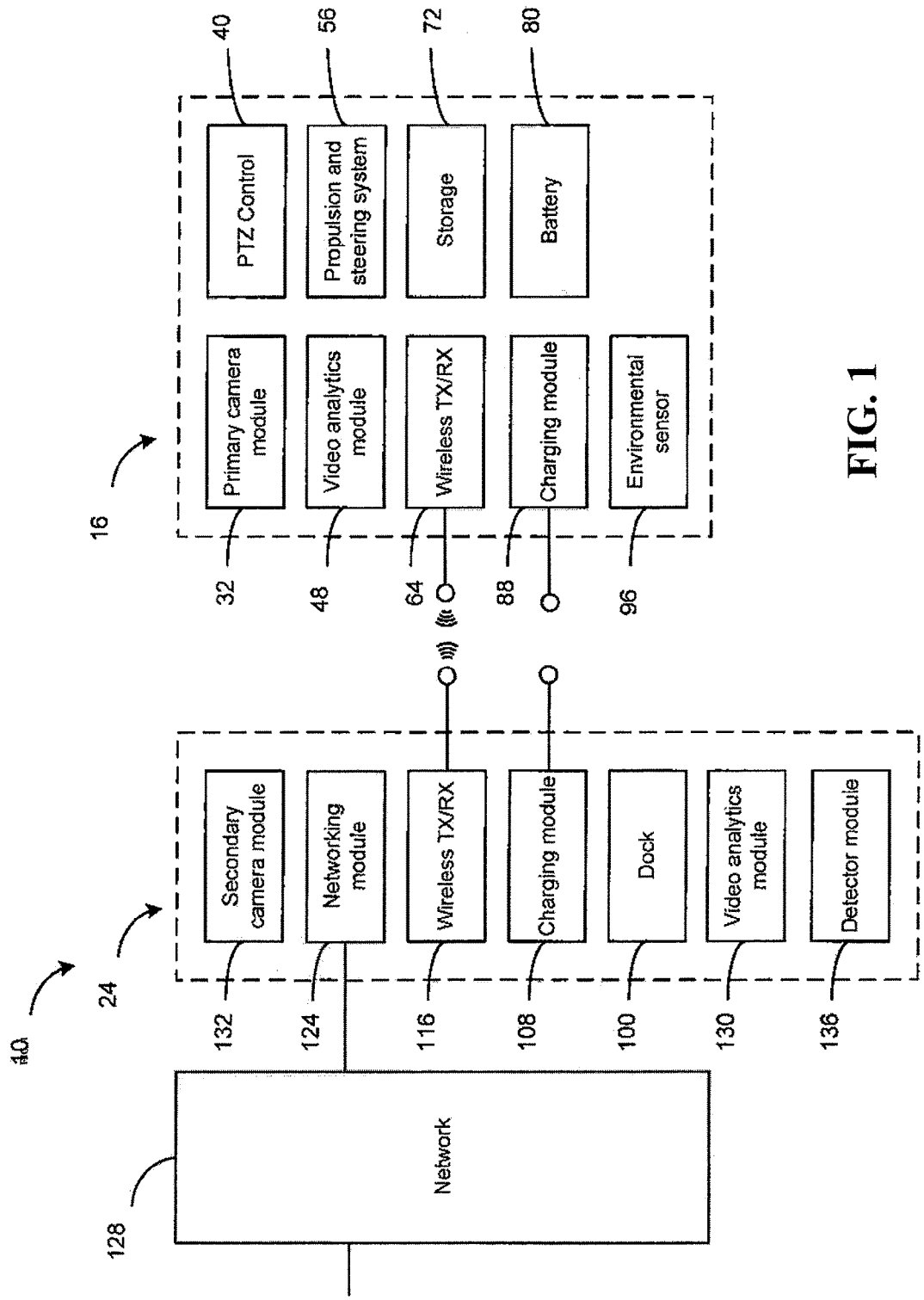
FIG. 1 illustrates a block diagram of a video surveillance system according to an example embodiment.

It will be appreciated that for simplicity and clarity of illustrates, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"Image data" herein refers to data produced by a camera device and that represents images captured by the camera device. The image data may include a plurality of sequential image frames, which together form a video captured by the camera device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images. It will be understood that "image data" as used herein can refer to "raw" image data produced by the camera device and/or to image data that has undergone some form of processing.

A "foreground visual object" refers to a visual representation of a real-life object (ex: person, animal, vehicle) found in the image frames captured by the video capture device. The foreground visual object is one that is of interest for various purposes, such as video surveillance. For example, the foreground visual object being in a scene may represent an event, such a human or vehicle being present. A foreground visual object may be a moving object or a previously moving object. The foreground visual object is distinguished from a background object, which is an object found in the background of a scene and which is not of interest. For example, at least one image frame of the video may be segmented into foreground areas and background areas. One or more foreground visual objects in the scene represented by the image frame are detected based on the Segmenting of 300. For example, any discrete contiguous foreground area or "blob" may be identified as a foreground visual object in the scene. For example, only contiguous foreground areas greater than a certain size (ex: number of pixels) are identified as a foreground visual object in the scene.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed (ex: lowered quality) and/or re-encoded image data. The processing of the image data may also cause additional information regarding the image data or objects captured within the images to be outputted. For example, such additional information is commonly understood as metadata. The metadata may also be used for further processing of the image data, such as drawing bounding boxes around detected objects in the image frames.

Referring now to FIG. 1, therein illustrated is a block diagram of a video surveillance system 10 according to an example embodiment. The video surveillance system 10 includes an aerial camera device 16 and a docking station 24.

Each of the aerial camera device 16 and the docking station is illustrated according to its respective operational modules. An operational module may be a mechanical component, a set of mechanical components, a hardware component or a set of hardware components. An operational module may also be implemented in hardware, software or combination of both.

The aerial camera device 16 and the docking station 24 each includes one or more processors, one or more memory devices coupled to the processors and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor may be implemented by any processing circuit having one or more circuit units, including a digital signal processor (DSP), graphics processing unit (GPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device coupled to the processor circuit operable to store date and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device may be implemented together within a system on a chip (SOC). For example, the processor, the memory device and the network interface may be implemented within a SOC. Furthermore, when implemented in this way, both a general purpose processor and DSP may be implemented together within the SOC.

The aerial camera device 16 includes a camera module 32 that is operable to capture a plurality of images and produce image data representing the plurality of captured images. The camera module 32 is herein referred to as the primary camera module 32 that produces primary image data. This primary image data is used for video surveillance purposes, such as evaluating characteristics of an area being monitored.

The primary camera module 32 generally refers to the combination of hardware and software sub-modules of the aerial camera device 16 that operate together to capture the plurality of images of a scene. Such sub-modules may include an optical unit (e.g. camera lens) and an image sensor. In the case of a digital camera module, the image sensor may be a CMOS, NMOS, or CCD type image sensor.

The lens and sensor combination defines a field of view. When positioned at a given location and an according to a given orientation, the primary camera module 32 is operable to capture the real-life scene falling within the field of view of the camera and to generate image data of the captured scene.

The primary camera module 32 may perform some processing of captured raw image data, such as compressing or encoding the raw primary image data.

According to various example embodiments, the primary camera module 32 is a pan-tilt-zoom module ("PTZ") that is operable of being displaced and/or rotated in a pan direction and in a tilt direction and that is further operable for performing optical zoom. The panning, tilting and/or zooming causes a change in the field of view of the primary camera module 32. For example, the primary camera module 32 may include one or more motors to cause the optical unit of the primary camera module 32 to be panned, tilted or zoom as well as to be stabilized, as is well known in the art.

According to the various example embodiments wherein the primary camera module 32 is a pan-tilt-zoom module, the aerial camera device 16 further includes a PTZ control 40 for controlling the panning, tilt, and zoom. The PTZ control 40 may receive PTZ commands issued. The PTZ commands may be issued according to a human operator interacting with an input device or by a computer-implemented module automatically issuing PTZ commands (e.g. an object tracking module). The PTZ control 40 is further operable for generating control signals for controlling the one or more motors based on the received PTZ commands.

The camera device 16 may optionally include a camera video analytics module 48. The video analytics module 48 receives primary image data from the primary camera module 16 and analyzes the image data to determine properties or characteristics of the captured image or video and/or of objects found in scene represented by the image or video. Based on the determinations made, the video analytics module 48 may further output metadata providing information about the determinations. Examples of determinations made by the video analytics module 48 may include one or more of foreground/background segmentation, object detection, object tracking, object classification, virtual tripwire, anomaly detection, facial detection, facial recognition, license plate recognition, identifying objects "left behind", monitoring objects (i.e. to protect from stealing), business intelligence and deciding a position change action. However, it will be understood that other video analytics functions known in the art may also be implemented by the video analytics module 48.

In some example embodiments, the aerial camera device 16 may further include one or more environmental sensors 96 for sensing one or more environmental conditions in proximity of the aerial camera device 16. For example, the environmental conditions may be chosen from temperature, wind speed, precipitation, humidity, sound, chemical, gas, explosive, co2, seismic vibrations, and any other environmental factor measurable by sensors.

The aerial camera device 16 further includes a propulsion and flight control subsystem 56, which provides the capability for the aerial camera device 16 to be airborne and displaced aerially. For example, the propulsion and flight control subsystem 56 permits the aerial camera device 16 to take off, land, and fly forward, backward, and laterally.

In one example embodiment, the propulsion and flight control subsystem 56 include the components of a flying drone, including but not limited to, one or more powered rotors. Accordingly, the aerial camera device 16 is configured to take off and land vertically, hover, fly forward, backward, and laterally and spin when hovering.

The camera device 16 further includes a transceiver 64 operable for communicating wirelessly with another device. The wireless communication may be provided according to any protocol known in the art, such as Bluetooth, Wi-Fi or ZigBee.

The aerial camera device 16 may optionally include a storage module 72. The storage module 72 is operable to store primary image data. The storage module 72 may also store metadata outputted from the video analytics module 48.

The storage module 72 provides non-transitory storage of image data and/or metadata. In other example embodiments wherein the storage module is not provided, image data generated by the primary camera module 32 and/or metadata generated by the video analytics module 48 may be immediately transmitted to an external device via the wireless transceiver 64.

The aerial camera device 16 further includes at least one battery 80 for supplying power to one or more components of the aerial camera device 16. The at least one battery 248 may supply power to at least the primary camera module 32, the PTZ control module 40, the propulsion and steering subsystem 56 and the wireless transceiver 64.

The aerial camera device 16 further includes a camera charging module 88 that operates to manage charging of the at least one battery 80. The camera charging module 88 receives power from an external source and provides a current to charge the at least one battery 80.

In one example embodiment, the charging module 88 may sense the charge level of the at least one battery 80 and implements charging of the battery 80 when the charge level falls below a predetermined level.

In another example embodiment, the charging module 88 may implement charging of the battery 80 any time power is available from the external source of power. The charging module 88 may be further operable to implement trickle charging of the battery 80.

Continuing with FIG. 1, the docking station 24 cooperates with the aerial camera device 16 to charge the aerial camera device 16 and to exchange data therewith.

The docking station 24 includes a dock 100. The dock 100 is a physical element upon which the aerial camera device 16 may be supported when it is in its docked position. For example, the dock 100 may present a substantially planar surface upon which the aerial camera device 16 may land.

The docking station 24 also includes a dock charging module 108. The dock charging module 108 acts as the source of power for that supplies the camera charging module 88 of the aerial device 16 to further charge the at least one battery 80.

In one example embodiment, the dock charging module 108 supplies an electrical current to the camera charging module 88 through direct physical contact between cooperating contact leads of the docking station 24 and the aerial camera device 16.

In another example embodiment, the dock charging module 108 transmits power wirelessly to the camera charging module 88. For example, the docking charging module 108 includes one or more coils of wires that generates a magnetic field. The magnetic field is coupled by magnetic induction with cooperating one or more coils of wires of the camera charging module 88 of the aerial camera device 16. The inductive coupling between the respective one or more coils induces a flow of electrical current in the camera charging module 88, which may be used to charge battery 80 of the aerial camera device 16.

The docking station 24 further includes a wireless transceiver 116 operable for providing data communication with the aerial camera device 16 via the wireless transceiver 64 of the aerial camera device 16. The wireless transceiver 116 of the docking station may implement a wireless communication protocol that is compatible with the communication protocol implemented by the transceiver 64 of the aerial camera device 16. For example, the transceiver 116 may also be a short-range, low-power transceiver. Primary image data generated by the primary camera module 32 of the aerial camera device 16 may be transmitted from the transceiver 64 of the aerial camera device 16 and received at the transceiver 116 of the docking station 24. PTZ control commands may be transmitted from the transceiver 116 of the docking station 24 and received at the transceiver 64 of the aerial camera device 16.

The wireless transceiver 116 of the docking station 24 and wireless transceiver 64 of the aerial camera device 16 provides wireless data communication between the docking station 24 and the aerial camera device 16 when the aerial camera device 16 is in its airborne position.

In some example embodiments, the aerial camera device 16 and docking station 24 continue to be in wireless data communication through their mutual wireless transceivers 64, 116 when the aerial camera device 16 is in its docked position.

In other example embodiments, the aerial camera device 16 may have a physical connector (e.g. plug, socket) that mates with a compatible physical connector (e.g. plug, socket) of the docking station 24 when the aerial camera device 16 is in its docked position. Accordingly, data communication between the aerial camera device 16 and the docking station 24 occurs via the mating physical connectors when the aerial camera device 16 is in its docked position. In such example embodiments, the aerial camera device 16 may use its wireless transceiver 64 to communicate with the docking station 24 only when the aerial camera device 16 is in its airborne position.

The docking station 24 further includes a networking module 124 operable for providing data communication with another device over a network 128. The network 128 may be a local area network, an external network (e.g. WAN, Internet) or a combination thereof. In other examples, the network 128 may include a cloud network.

The docking station 24 may optionally include a dock video analytics module 130. According to example embodiments where a dock video analytics module 130 is provided, the dock video analytics module 130 also performs video analytics on the primary image data that is received from the aerial camera device 16. The description provided herein with respect to the camera video analytics module 48 are also applicable to a docking video analytics module 130.

Within one example embodiment, the aerial camera device 16 includes a camera video analytics module 48 and the docking station 24 does not have any video analytics capabilities. Accordingly, video analysis of the primary image data within the video surveillance system 10 is performed exclusively by the camera video analytics module 48.

Within another example embodiment, the docking station 24 includes a dock video analytics module 130 and the aerial camera device 16 does not include any video analytics capabilities. Accordingly, video analysis of the primary image data within the video surveillance system 10 is performed exclusively by the dock camera video analytics module 130. This analytics performed on the primary image data after receiving it from the aerial camera device via the wireless transmission.

Within yet another example embodiment, the aerial camera device 16 includes a camera video analytics module 48 and the docking station 24 includes a dock video analytics module 130 and the video analytics capabilities are split between the two video analytics modules 48, 130.

According to various example embodiments, the docking station 24 also includes a camera module 132. The camera module 132 defines a second field of view and is operable for generating image data corresponding to that second field of view. The camera module 132 of the docking station 24 is herein referred to as the secondary camera module 132 that produces secondary image data. This secondary image data is used for providing visual feedback about the aerial camera device 16 when the aerial camera device 16 is in the airborne position.

The second camera module 132 may have an optical unit having a wide field of view. For example, the second camera module 132 may have an optical unit that includes a wide angle lens.

According to various example embodiments, the second camera module 132 is also a pan-tilt-zoom module that is operable of being displaced and/or rotated in a pan direction and in a tilt direction and that is further operable for performing optical zoom. The panning, tilting and/or zooming causes a change in the field of view of the secondary camera module 132. For example, the second camera module 132 may include one or more motors to cause the optical unit of the second camera module 132 to be panned, tilted or zoom, as is well known in the art.

In some example embodiments, the primary camera module 32 is operable to generate primary image data that is of significantly higher quality than the secondary image data generated by the second camera module 132. For example, the primary image data has significantly higher resolution (ex: number of megapixels) than the secondary image data. Additionally, or alternatively, the primary image data has a higher frame rate than the secondary image data.

According to an example operation of the example video surveillance system 10, the aerial camera device 16 may be operated between at least a docked position and an airborne position. The docking station 24 may further include a detector module 136 that is operable for detecting when the aerial camera device 16 is present at docking station 24 in its docked position and for detecting when the aerial camera device 16 is disengaged from the docking station 24 in its airborne position.

In the docked position, the aerial camera device 16 is physically engaged with and physically supported by the dock 100 of docking station 24. Accordingly, the aerial camera device 16 is static at a location corresponding to the location of the dock 100 of docking station 24. The propulsion and steering subsystem 56 is not being operated when the aerial camera device is in its docked position.

While the aerial camera device 16 is its docked position, the primary camera module 32 is operable to capture images of the scene corresponding to its current field of view and to generate primary image data corresponding to the captured images.

It will be appreciated that operation of the aerial camera device 16 when it is in the docked position is similar to the operation of a typical static surveillance camera. The field of view of the primary camera module 32 is always defined according to the location of the dock 100 of the docking station 24 and the orientation of the optical unit of the camera module 32 from that location. Even according to example embodiments wherein the primary camera module 32 is operable of being displaced in a pan direction and tilt direction and of performing optical zoom, the panning, tilting and the zoom is always relative to the fixed location where the aerial camera device 16 is resting on the dock 100 of the docking station 24.

As described elsewhere herein, the dock charging module 108 provides the power for charging the battery 80 of the aerial device 16 via the camera charging module 88 when the aerial camera device 16 is in its docked position.

As described elsewhere herein, primary image data generated by the primary camera module 32 is transmitted to the docking station 24. The primary image data received at the docking station 24 is further transmitted using the networking module 124 over the network 128 to a destination external networked device.

The primary image data generated by the primary camera module 32 is used for video surveillance purposes and the destination external network device is one that is used for carrying out the video surveillance. For example, the external network device may be a workstation that carries out processing and/or management of the primary image data. Video management refers to functions related to video transmission, playback and/or storage. The external network device may be a client device used by one or more users to view the image data and to provide user inputs. The user inputs may be for manipulating the primary image data and/or for inputting commands relating to control of the primary camera module, such as issuing PTZ commands. The user inputted commands may be received at the docking station 24 via the networking module 124, which is then further transmitted to the aerial camera device 16.

According to various example embodiments, the secondary camera module 132 of the docking station 24 is non-operational when the aerial camera device 16 is in its docked position. The second camera module 132 is non-operational in that it is not generating secondary image data.

Figure 2:
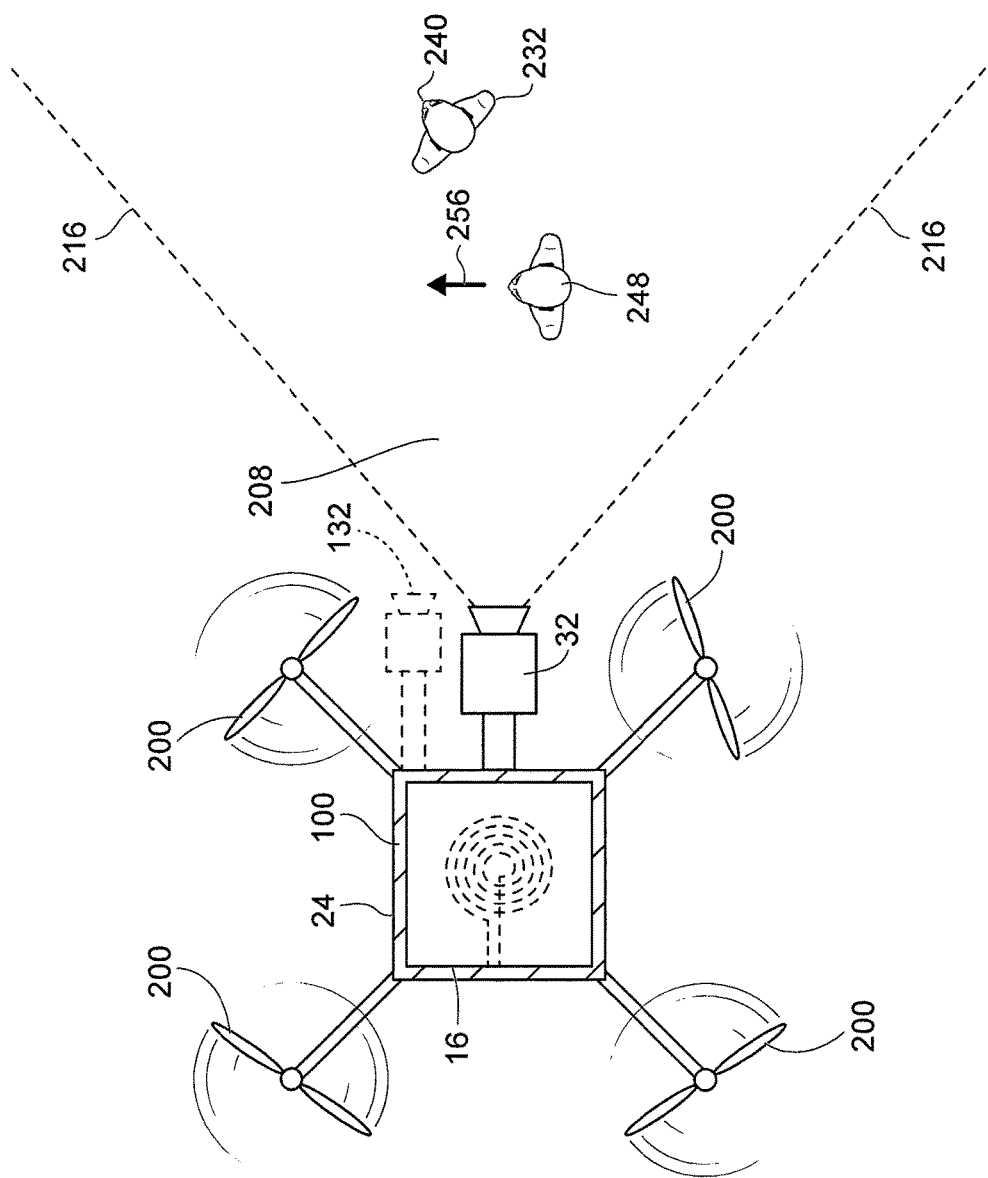
FIG. 2 illustrates a plan view of the exemplary video surveillance system in operation when an example aerial camera device is in a docked position.

Referring now to FIG. 2, therein illustrated is a plan view of the exemplary video surveillance system 10 in operation when the aerial camera device 16 is in its docked position relative to the docking station 24. The aerial camera device 16 is resting on a surface of the dock 100 of the docking station 24.

According to the illustrated example, the propulsion and steering subsystem 56 of the aerial camera device 16 has a plurality of rotors 200. Accordingly, the aerial camera device 16 is configured to be displaced in the same manner as a rotorcraft drone.

The primary camera module 32 of the aerial camera device 16 is illustrated to be oriented laterally of the aerial camera device 16. It will be understood that this positioning of the primary camera module 32 is for illustrative purposes only and that in other example embodiments, the primary camera module 32 may be coupled at another appropriate portion of the aerial camera device 16 and according to the PTZ position of the optical unit.

According to the illustrated current orientation and positioning of the primary camera module 32, a primary field of view 208 of the primary camera module 32 is located laterally of the aerial camera device 16. In the plan view, the primary field of view 208 is defined by its boundaries 216.

A real-life object 232 is located within the primary field of view 208 of the primary camera module 32. According to various example embodiments wherein video analytics is performed on the primary image data, one or more functions of the processing the image data may be performed specifically in respect of a foreground visual object in the image data representing the real-life object 232. These functions may include detecting, tracking and/or classifying the foreground visual object. Other analytics functions may include pattern or facial recognition.

It was observed that although the real-life object 232 is located within the primary field of view 208, performing one or more visual analytics functions on the foreground visual object representing the real-life object 232 from a statically located camera experiences several limitations.

A first limitation is the distance of the real-life object 232 from the static primary camera module 32. The amount of detail that may be obtained about a foreground visual object representing the real-life object 232 within the primary image data decreases as the real-life object 232 is located farther away from the primary camera module 32. Although zooming may be used to acquire visual information for far away located objects, the problem of decreasing visual information will exist once the maximum operable zoom of the primary camera module 32 has been reached.

A second limitation is the orientation of the real-life object 232 with respect to the primary camera module 32. The primary camera module 32 is capable of only capturing portions of the real-life object 232 that are facing the primary camera module 32. Visual characteristics located on portions of the real-life object 232 that are facing away from the primary camera module 32 are not captured with the primary image data. In the example of FIG. 2, it will be appreciated that the real-life object is a human whose face 240 is partially facing away from the primary camera module 32 and whose back is partially turned towards the primary camera module 32. Accordingly, at least a portion of the face 240 of the human 232 is not captured by the primary capture module 32. Such information may be useful to perform facial detection of the human 232 with increased accuracy.

A third limitation is the requirement for an unobscured line of sight. When another real world object is located between the primary camera module 32 and the real-life object of interest 232, the other real-life object may obscure the real-life object of interest 232. This may lead to visual information about the real-life object of interest 232 not being captured. In the example of FIG. 2, a second real-life object 248 is located closer to the primary camera module 32 than the real-life object 232 of interest. As the second real-life object 248 moves in the direction indicated by arrow 256, it will eventually be located in the line of sight of the primary camera module 32 and at least partially obscure the real-life object of interest 232.

In the airborne position, the aerial camera device 16 is physically disengaged from the docking station 24. To enter the airborne position from the docked position, the propulsion and steering subsystem 56 is activated to cause the aerial camera device 16 to take off from the docking station 24. The propulsion and steering subsystem 56 is further operated to cause the aerial camera device 16 to remain airborne. While being airborne, the aerial camera device 16 may be further flown forward, backward and laterally.

The propulsion and steering subsystem 56 is powered by the at least one battery 80 when in the airborne position. Due to being physically disengaged from the docking station 24 when in the airborne position, the aerial camera device 16 ceases receiving electrical power from the dock charging module 108 of the docking station 24.

The at least one battery 80 also provides power to the primary camera module 32 so that the primary camera module 32 continues to generate primary image data when the aerial camera device 16 is in its airborne position. The primary image data is transmitted wirelessly via the wireless transceiver 64 to the wireless transceiver 116 so that it is received at the docking station 24. The primary image data is further transmitted from the docking station 24 using the networking module 124 over the network 128 to a destination external networked device. When in the airborne position, primary image data generated by the primary camera module 32 continues to be used for video surveillance purposes and the destination external network device is one that is used for carrying out the video surveillance. The primary image data generated while the aerial camera device 16 is in its airborne position may be received at the destination external network device substantially in real-time (e.g. there may be some processing and transmission delays). This allows for real-time video surveillance and monitoring based on primary image data generated when the aerial camera device is in its airborne position.

In some example embodiments, the primary image data transmitted wirelessly to the docking station 24 when the aerial camera device 16 is in its airborne position may be modified primary image data. The primary image data may be modified in that it is lower quality than the best quality image data that the primary camera module 32 may generate. Additionally, or alternatively, the primary image data may be modified in that it is lesser quality than the quality of primary image data that is transmitted to the docking station 24 when the aerial camera device 16 is in its docked position.

The modified primary image data may be of lesser quality in that it has a lower frame rate. Additionally, or alternatively, the modified primary image data may be of lower quality in that it has a lower resolution.

It will be appreciated that the modified primary image data having a lower quality will have a lower bitrate, which lower the wireless transmission requirements for communicating the modified primary image data to the docking station 24 when the aerial camera device 16 is in its airborne position. In some examples, the best quality image data generated by the primary camera module 32 may be stored in the storage 72 of the aerial camera device 16. The stored best quality image data may be later transmitted to the docking station 24 and other networked devices when the aerial camera device 16 returns to its docked position.

In various example embodiments wherein the aerial camera device 16 includes a video analytics module 48, the video analytics module 48 may continue performing video analytics module 48 when the aerial camera device 16 is in its airborne position. The generated metadata may also be transmitted wirelessly via transceiver 64 to transceiver 116 of the docking station 24.

In other example embodiments, the primary image data, whether modified or not, may be transmitted to docking station 24, and video analytics is performed by the video analytics module 130 of the docking station 24.

When it is detected that the aerial camera device 16 has entered its airborne position from its docking position, the secondary camera module 132 is activated to begin generating secondary image data. The secondary camera module 132 may be oriented so that its field of view substantially corresponds with the field of view of the primary camera module 32 immediately prior to aerial camera device 16 entering its airborne position. That is, the secondary camera module 132 is oriented to capture a scene that was previously being captured by the primary camera module 32.

The secondary image data generated by the secondary camera module 132 provides visual feedback about the aerial camera device 16 when the aerial camera device 16 is in its airborne position. When the aerial camera device 16 is within the field of view of the secondary camera module 132, the secondary image data contains information regarding the position of the aerial camera device 16 relative to other objects within the field of view of the secondary camera module 132. Moreover, by orienting the field view of the secondary camera module 132 to substantially correspond to the field of view of the primary camera module 32 immediately prior to the aerial camera device 16 entering its airborne position, the secondary camera module 132 will be looking at an area of interest previously being monitored by the primary camera module 32. Accordingly, the secondary camera module 132 monitors the aerial camera device 16 as it is displaced to further investigate the area of interest.

By providing visual feedback about the aerial camera device 16, the secondary image data generated by the secondary camera module 132 may be useful for monitoring the aerial camera device 16. For example, in some example embodiments, the secondary camera module 132 is transmitted over the network 128 to an external networked device that includes a display device that displays the secondary image data. A human operator may view the secondary image data and monitor the position of the aerial camera device 16. The human operator may view the secondary image data substantially in real-time while interacting with an input device to issue aerial displacement commands and/or PTZ commands to control the aerial camera device 16. The providing of the secondary image data may also allow compliance with certain applicable regulations that require unmanned aerial vehicles to be controlled by a human operator.

According to some example embodiments, the secondary image data may be analyzed to detect when the aerial camera device 16 is exiting the field of view of the secondary camera module 132. For example, video analytics may be performed on the visual object in the secondary image data representing the aerial camera device 16. This may be performed by the video analytics module 130 of the docking station. For example, location of the aerial camera device visual object is tracked to determine when the aerial camera device 16 is approaching exiting the second field of view of the secondary camera module 132. When it is detected that the aerial camera device 16 is exiting the field of view, an action may be taken, such as transmitting a warning alert over the network 128 to an external networked device.

In some example embodiments wherein the secondary camera module 132 is a PTZ, the secondary camera module 132 may be automatically controlled based on the tracking of the visual object in the secondary image data representing the aerial camera device 16 to ensure that the second field of view of the secondary camera module 132 follows the displacement of the aerial camera device 16.

The aerial camera device 16 may also be operable for receiving via its transceiver 64 aerial displacement commands transmitted wirelessly from the transceiver 116 of the docking station 24. The aerial displacement commands are processed by the propulsion and steering subsystem 56 and the propulsion and steering subsystem 56 is operated to displace the aerial camera device 16 according to the aerial displacement commands.

The aerial displacement commands may be received at the docking station 24 from an external network device over the network 128. The aerial displacement commands may be issued by a human operator interacting with an input device, such as 128. The human operator may issue the commands while monitoring substantially in real-time the primary image data or the secondary image data.

The aerial displacement commands may also be issued automatically based on the tracking of a real-life object of interest performed by the video analytics module 48, video analytics module 130, or both.

The aerial camera device 16 may further land on the dock 100 of the docking station 24 to return to its docked position.

When the detector module 136 detects that the aerial camera device 16 has returned to the docking position from being in the airborne position, the secondary camera module 132 may cease generating secondary image data.

By entering the airborne position and by being displaced to appropriate locations (e.g. longitudinal, latitudinal and altitudinal positions), the field of view of the primary camera module 32 of the aerial camera device 16 may be adjusted with more degrees of freedom than when the aerial camera device is in a static location (e.g. when in its docked position). For example, the aerial camera device 16 may be displaced to at least partially overcome the above described limitations of a statically located camera device.

When in the airborne position, the aerial camera device 16 may be displaced closer to a real-life object of interest. This may at least partially overcome the loss of detail when the real world object is located at a significantly large distance from the otherwise statically located camera device.

According to various example embodiments wherein the aerial camera device 16 includes one or more environmental sensors 60, the displacing the aerial camera device 16 also allows for sensing environmental conditions at different locations.

When in the airborne position, the aerial camera device 16 may be further displaced so that its field of view is oriented towards portions of interest of the real-life object of interest.

Furthermore, when in the airborne position, the aerial camera device 16 may be further displaced so that its field of view avoids intermediate objects that could otherwise obscure a real-life of interest.

Figure 3:
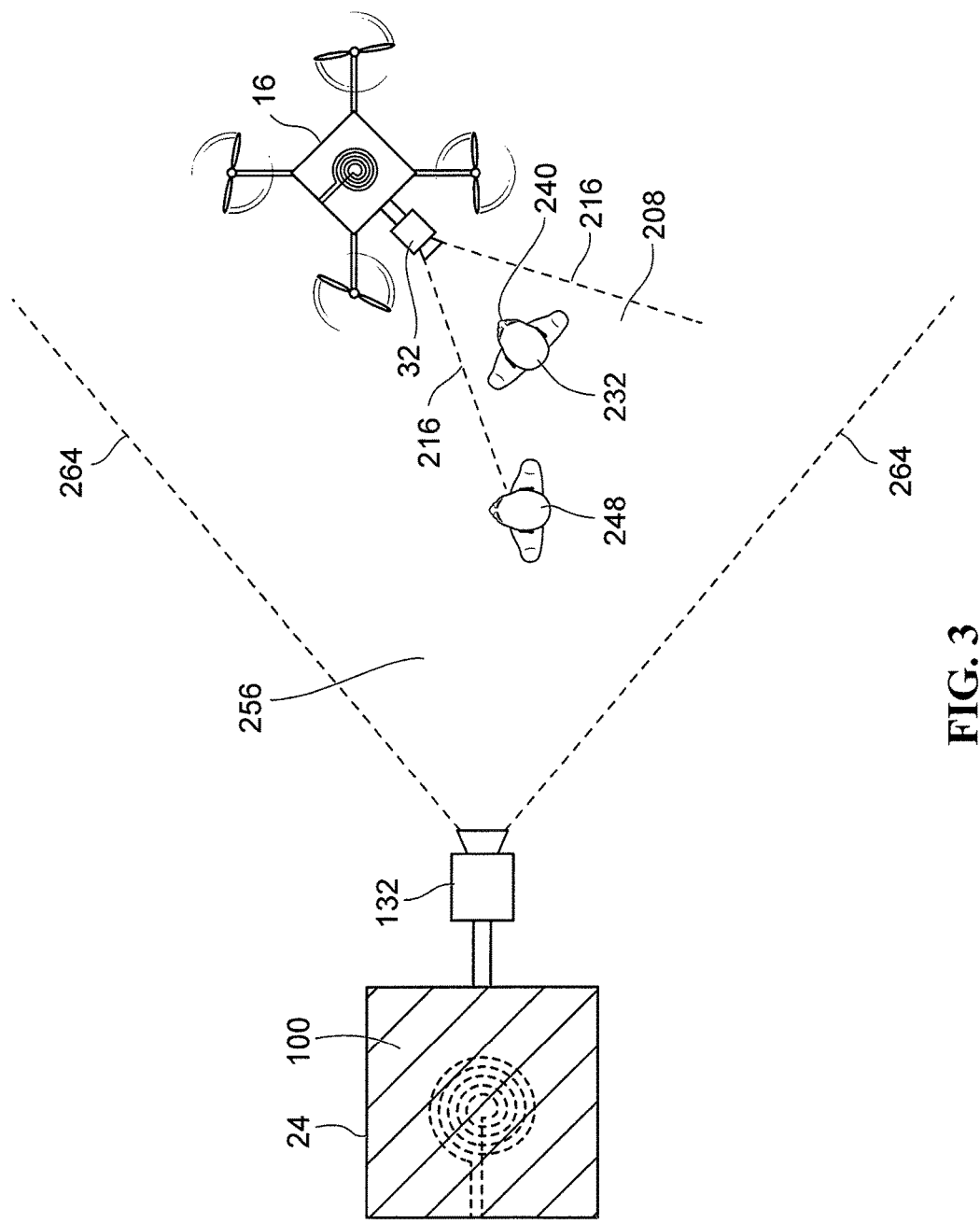
FIG. 3 illustrates a plan view of the exemplary video surveillance system in operation when the example aerial camera device is in an airborne position.

Referring now to FIG. 3, therein illustrated is a plan view of the exemplary video surveillance system 10 in operation when the aerial camera device 16 is in its airborne position relative to the docking station 24.

As illustrated, the aerial camera device 16 has been displaced aerially to be located remotely of the docking station 24. More specifically, in the example operation, the aerial camera device 16 has been displaced aerially to be located closer to the real-life object of interest 232.

Furthermore, the field of view of the primary camera module 32 has been changed. From its current location, the aerial camera device 16 is facing the face 240 of the human object of interest 232. This allows the face 240 of the human object of interest 232 to be captured, which may be further used for, for example, facial detection.

From this changed field of view, the other real-life object 248 is no longer in the line of sight between the primary camera module 32 and the real-life object of interest 232. Therefore, features of the real-life object of interest 232 are no longer obscured by the other object 248.

It will be appreciated that the illustrated example of FIG. 3 demonstrates how the above described limitations may be overcome by aerially displacing the aerial camera device 16 to an appropriate location when the aerial camera device 16 is in its airborne position.

FIG. 3 further illustrates the secondary camera module 132 being in operation. A secondary field of view 256 of the secondary camera module 132 is defined by its boundaries 264. The aerial camera device 16 is located within the secondary field of view 256. Accordingly, secondary image data generated by the secondary camera module 132 provides visual feedback about the aerial camera device.

Figure 4:
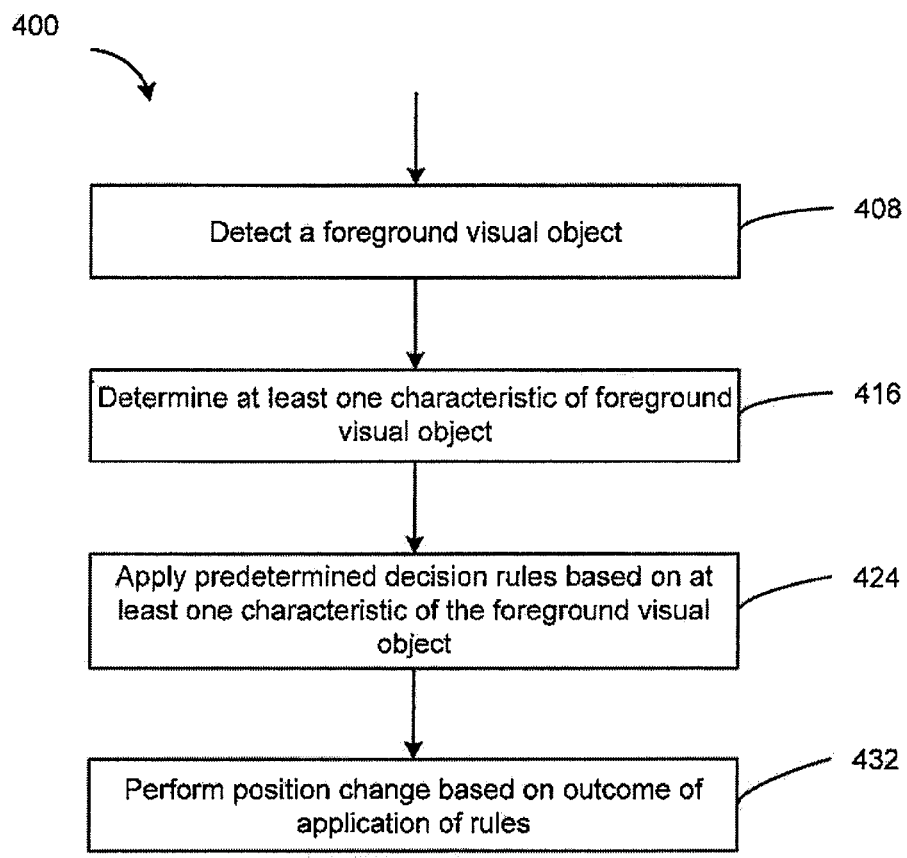
FIG. 4 illustrates a flowchart of an example method for determining whether to perform a position change action on the aerial camera device.

Referring now to FIG. 4, therein illustrated is a flowchart of an example method 400 for determining whether to perform a position change action. A "position change action" herein refers to an action related to the aerial camera device 16 leaving its docked position and entering its airborne position. The example method may be performed by the video analytics module of the video surveillance system 10, which may be the video analytics module 48 of the aerial camera device 16, the video analytics module 130 of the docking station 24, or a combination thereof.

At step 408, a foreground visual object is detected within the primary image data generated by the primary camera module 32 while the aerial camera device 16 is in its docked position.

At step 416, video analytics is performed to determine at least one characteristic of the foreground visual object. The at least one characteristic may include the class of the foreground visual object, an estimated distance of the real-life object represented by foreground visual object from the aerial camera device 16, one or more visual features of the foreground visual object, whether visual features of the real-life object represented by foreground visual object are perceptible or obscured and an orientation of the real-life object represented by the foreground visual object.

At step 424, one or more predetermined decision rules are applied using the at least one characteristic of the foreground visual object. The decision rules may set based on user inputted commands.

At step 432, a position change action may be selectively performed based on the outcome of the application of the decision rules to the at least one characteristic. The type of position change action that is performed may vary depending on the outcome of the application of the decision rules.

In one example, it may be decided that a position change action is to be performed at steps 424 and 432 when the foreground visual object possesses one or more predetermined characteristics, such as being of a certain class, having one or more particular features, being obscured and/or being oriented away from the primary camera module 32. In other examples, a specific set of visual features may be specified and a position change action is performed only if the foreground object has that specific set of visual features.

Where the foreground visual object does not possess the one or more predetermined characteristics, it may be decided that a position change action should not be performed.

A position change action may be to automatically operate the propulsion and steering module 56 of the aerial camera device 16 to take off from the docking station 24 and enter its airborne position. A further determination may be made as to an aerial location that the aerial camera device 16 should be displaced to.

A position change action may be to transmit a position change message. This message may be transmitted to an external network device over the network 128. The message may indicate that a real world object represented by a foreground visual object in the primary image data should be viewed more closely by operating the aerial camera device 16 in its airborne position. For example, the message may be received at a client device and displayed on a display device of being used by a human user performing video monitoring. The human user may then manually issue a command to cause the aerial camera device 16 to take off.

In various example embodiments, a human user may manually issue a command at any time to cause the aerial camera device 16 to take off and enter its airborne position.

Figure 5:
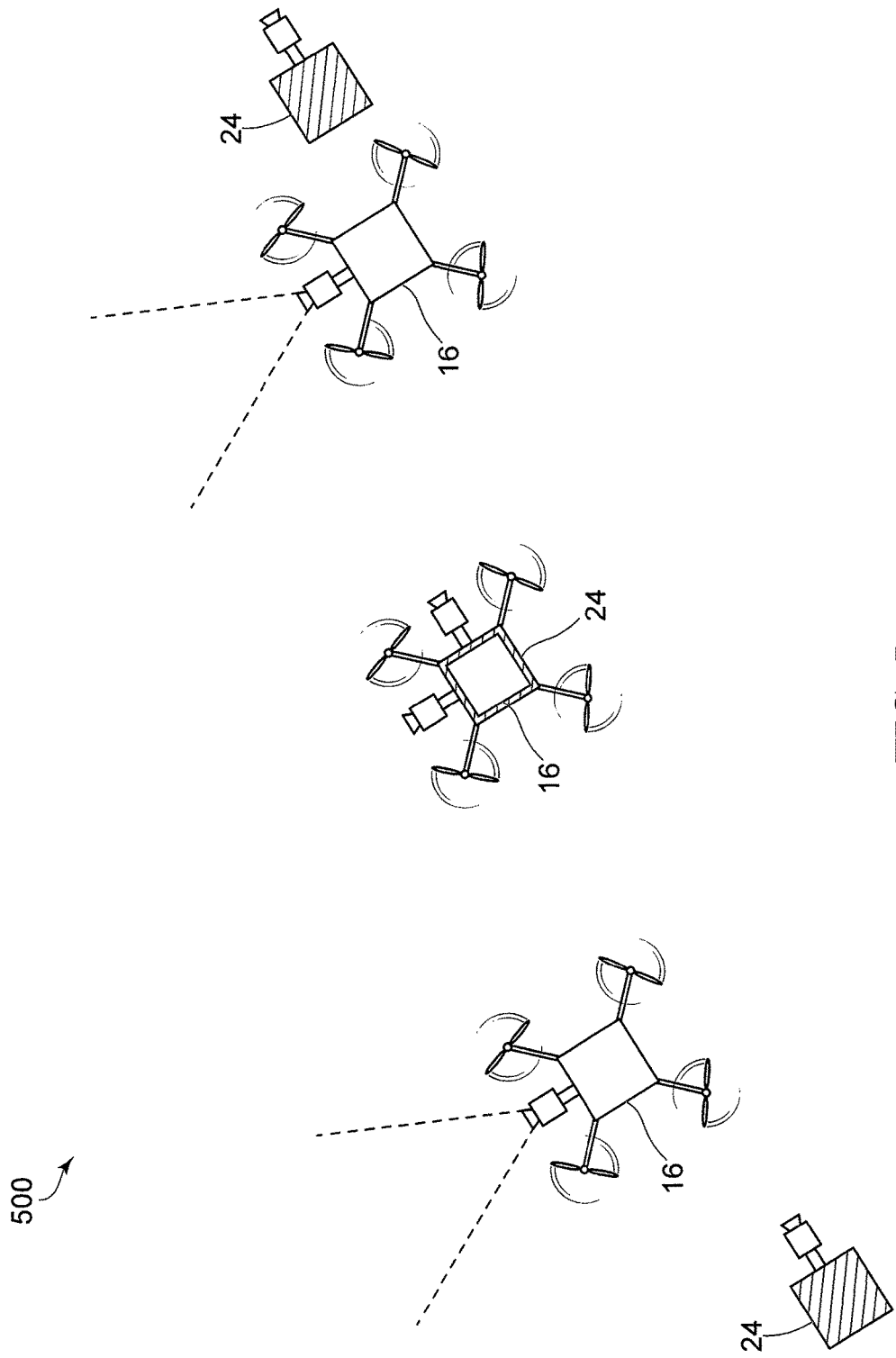
FIG. 5 illustrates a schematic diagram of an alternative video surveillance system having a plurality of aerial camera devices according to one example embodiment.

Referring now to FIG. 5, therein illustrated is a schematic diagram of an alternative video surveillance system 500 according to one example embodiment having a plurality of aerial camera devices 16 and a plurality of docking stations 24. The plurality of docking stations 24 are positioned to be spaced apart. For example, two adjacently located docking stations 24 may be positioned within a distance apart that is shorter than a distance that an aerial camera device 16 can travel on a battery charge.

For example, the distance apart is shorter than a distance that an aerial camera device 16 can travel on a less than full battery charge.

For example, the distance apart is shorter than a distance that an aerial camera device 16 can travel on about 50% full battery charge.

For example, the distance apart is shorter than a distance that an aerial camera device 16 can travel on about 60% full battery charge.

For example, the distance apart is shorter than a distance that an aerial camera device 16 can travel on about 70% full battery charge.

For example, the distance apart is shorter than a distance that an aerial camera device 16 can travel on about 80% full battery charge.

In an example deployment, a given aerial camera device 16 is charged while in a docked position at a first docking station 24. The given aerial camera device 16 then takes off from the first docking station 24 and is aerially displaced towards a second docking station 24 that is adjacent to the first docking station 24. As the given aerial camera device 16 is travelling towards the second docking station 24, its primary camera device 32 captures primary image data corresponding to the geographical region between the first docking station 24 and the second docking station 24. The given aerial camera device 16 then lands onto the second docking station and assumes a docked position at the second docking station 24. Accordingly, the given aerial camera device 16 is charged at the second docking station 24.

In an example deployment having a plurality of aerial camera devices 16, the displacement of the aerial camera devices 16 between adjacent docking stations 24 may be coordinated. For example, as a given first aerial camera device 16 is approaching the second docking station 24, a second aerial camera device 16 that was previously being charged at the second docking station 24 takes off from the second docking station 24. The second docking station 24 then begins travelling towards another docking station 24 while capturing image data corresponding to the geographical region between the second docking station 24 and the other docking station 24.

The other docking station 24 may be the first docking station 24. Accordingly, the first and second aerial camera devices 16 alternate between travelling between the first docking station and the second docking station, thereby providing substantially continuous monitoring of the geographical region between the first and second docking stations 24.

In an expanded example deployment, a plurality of docking stations may be provided and an equal number aerial camera devices may also be provided. For each pair of adjacent docking stations, two aerial camera devices alternatively travel between the adjacent docking stations according to the example described above. Accordingly, the geographical region between each pair of adjacent docking stations is constantly being monitored by at least one aerial camera device 16. For example, the expanded example deployment may be useful for video surveillance of a large distance perimeter.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A video surveillance system comprising:
   an aerial camera device being operable to be displaced aerially, the device comprising:
      a primary camera defining a first field of view and being operable for generating primary image data corresponding to the first field of view;
      at least one battery for powering the primary camera; and
      a charge receiving module for receiving power for charging the at least one battery, the charge receiving module comprising a first pair of contact leads or a first one or more coils of wires; and
   a docking station comprising:
      a dock, the aerial camera device being received in the dock when in a docked position and being disengaged from the dock when in an airborne position;
      a charge transmitting module for transmitting power for charging the aerial camera device when in the docked position, the charge transmitting module comprising a second pair of contact leads configured to cooperate with the first pair of contact leads to transmit power to the charge receiving module through a wired path, or a second one or more coils of wires configured. to cooperate with the first one or more coils of wires to inductively transmit power to the charge receiving module;
      at least one transceiver being operable for data communication with the aerial camera device when the aerial camera device is in the docked position and when the aerial camera device is in the airborne position; and
      a secondary camera defining a second field of view and operable for generating secondary image data corresponding to the second field of view, the secondary image data providing visual feedback about the aerial camera device when the aerial camera device is within the second field of view while in the airborne position.

2. The video surveillance system of claim 1, wherein the aerial camera device further comprises a wireless transceiver operable for transmitting primary image data to the docking station when the aerial camera device is in its airborne position.

3. The video surveillance system of claim 2, wherein the wireless transceiver is further operable for receiving aerial displacement commands from the docking station.

4. The video surveillance system of claim 1, wherein the docking station further comprises a networking interface operable for transmitting primary image data received from the aerial camera device to an external network device over a network.

5. The video surveillance system of claim 4, wherein the networking interface is further operable for receiving aerial displacement commands from an external network device over the network.

6. The video surveillance system of claim 1, wherein the primary camera is configured to generate primary image data while in the docked position and while in the airborne position.

7. The video surveillance system of claim 6, wherein the secondary camera is configured to generate secondary image data while the aerial camera device is in its airborne position and to cease generating secondary image data when the aerial camera device returns to its docked position.

8. The video surveillance system of claim 1, wherein the primary camera, is pivotable in a pan direction and in a tilt direction and is further operable for performing optical zoom.

9. The video surveillance system of claim 8, wherein the aerial camera device further comprises a wireless transceiver operable for receiving pan-tilt-zoom controls for adjusting the field of view of the primary camera.

10. The video surveillance system of claim 1, wherein at least one of the aerial camera, device and the docking station comprises a video analytics module, the video analytics module comprising a processor and a memory device coupled to the processor, the memory device storing computer program instructions that are executable by the processor and that, when executed by the processor, cause the processor to determine at least one characteristic of the primary image data and to implement a rule for undocking the aerial camera device from its docked position to enter its airborne position based on the determined at least one characteristic.

11. The video surveillance system of claim 10, wherein the computer program instructions, when executed by the processor, further cause the processor to detect a foreground object in the video represented by the primary image data and wherein the rule for undocking the aerial camera device from its docked position is based on at least one characteristic of the foreground object.

12. The video surveillance system of claim 11, wherein the at least one characteristic of the foreground visual object comprises at least one of class of the foreground visual object, estimated distance of a real-life object represented by the foreground visual object from the aerial camera device, one or more visual features of the foreground visual object, the real-life object represented by the foreground visual object being visually obscured and an orientation of the real-life object represented by the foreground visual object.

13. The video surveillance system of claim 12, wherein the at least one characteristic of the foreground object being of a human class and the orientation of the human class and wherein the rule defines undocking the aerial camera device when the human object is facing away from the primary camera.

14. The video surveillance system of claim 1, wherein the aerial camera device further comprises at least one environmental sensor.

15. The video surveillance system of claim 1, wherein the secondary camera is operable for detecting a location of the aerial camera device within the second field of view and for transmitting an alert when the aerial camera device exits the second field of view.

16. The video surveillance system of claim 1, wherein the image resolution of the primary image data is substantially higher than the image resolution of the secondary image data.

* * * * *